US 8,773,693 B2

(12) United States Patent
Akimoto (10) Patent No.: US 8,773,693 B2
(45) Date of Patent: Jul. 8, 2014

(54) COMMUNICATION APPARATUS CAPABLE OF REFERRING TO TRANSMISSION JOB HISTORY, CONTROL METHOD THEREFOR, AND STORAGE MEDIUM STORING CONTROL PROGRAM THEREFOR (75) Inventor: Naoto Akimoto, Chigasaki (JP)

(73) Assignee: Canon Kabushiki Kaisha (JP)

( * ) Notice: Subject to any disclaimer, the term of this patent is extended or adjusted under 35 U.S.C. 154(b) by 367 days.

(21) Appl. No.: 13/094,435

(22) Filed: Apr. 26, 2011

(65) Prior Publication Data
US 2011/0267649 A1 Nov. 3, 2011

(30) Foreign Application Priority Data
Apr. 28, 2010 (JP) ................... 2010-103193

(51) Int. Cl.
G06F 15/00 (2006.01)
G06F 3/12 (2006.01)
(52) U.S. Cl.
USPC .......................................... 358/1.15; 358/1.6
(58) Field of Classification Search
USPC ............... 358/1.16, 1.15, 1.6, 1.18, 400, 401, 358/404, 444, 434
See application file for complete search history.

(56) References Cited

U.S. PATENT DOCUMENTS

2004/0078448 A1* 4/2004 Malik et al. ................... 709/206
2007/0140532 A1* 6/2007 Goffin ............................ 382/118
2009/0033994 A1* 2/2009 Urakawa et al. ............. 358/1.15
2009/0094254 A1 4/2009 Akita et al.
2010/0199177 A1* 8/2010 Kraenzel et al. .............. 715/261
2010/0229100 A1* 9/2010 Miller et al. ................... 715/745
2012/0198561 A1 8/2012 Hikichi et al.

FOREIGN PATENT DOCUMENTS

| JP | 2005-094414 A | 4/2005 |
| JP | 2005-142622 A2 | 6/2005 |
| JP | 2006-041598 A | 2/2006 |
| JP | 2007-104063 A | 4/2007 |
| JP | 2009-094711 A | 4/2009 |
| JP | 20010257201 | * 11/2010 |

OTHER PUBLICATIONS

Office Action dated Apr. 22, 2014, issued in corresponding Japanese Patent Application No. 2010-103193.

* cited by examiner

Primary Examiner — Jerome Grant, II
(74) Attorney, Agent, or Firm — Rossi, Kimms & McDowell LLP (57) ABSTRACT A communication apparatus that enables to refer to transmission history information in response to settings of use proprieties for transmission methods. A recording unit records a history of a transmission job executed by the communication apparatus as transmission history information that includes a transmitting destination at least. A setting unit sets a use propriety of each of the transmission methods. A determination unit determines whether reference to the transmission history information is permitted in response to the use propriety of each of the transmission methods set by the setting unit and the transmitting destination included in the transmission history information, when a user instructs to refer to the transmission history information.

15 Claims, 7 Drawing Sheets

RemoteUI AUSEND

SMTP SMB/FTP AUTH | SEND LIMITATION

TRANSMISSION LIMIT SETTING

E-mail TRANSMISSION — 501

TRANSMISSION PERMISSION
- ○ NOT PERMITTED.
- ◉ ALL DESTINATIONS ARE PERMITTED.
- ○ ONLY SELF-DESTINATION IS PERMITTED.

FAX TRANSMISSION
- ☑ FAX TRANSMISSION IS PERMITTED.

FILE TRANSMISSION — 502

TRANSMISSION PERMISSION
- ○ NOT PERMITTED.
- ◉ ALL DESTINATIONS ARE PERMITTED.
- ○ ONLY SELF-DESTINATION OR DESIGNATED FOLDER IS PERMITTED.

MEMORY MEDIA TRANSMISSION
- ☑ TRANSMISSION TO MEMORY MEDIA IS PERMITTED.

[ OK ]  [ CANCEL ]  APPLY (A)

COMMUNICATION APPARATUS CAPABLE OF REFERRING TO TRANSMISSION JOB HISTORY, CONTROL METHOD THEREFOR, AND STORAGE MEDIUM STORING CONTROL PROGRAM THEREFOR

BACKGROUND OF THE INVENTION

1. Field of the Invention

The present invention relates to a communication apparatus capable of referring to a history of transmission jobs that have been executed, a control method therefor, and a storage medium storing a control program therefor.

2. Description of the Related Art

Some communication apparatuses require authentication when using the communication apparatus itself or when using a function thereof. On the other hand, some image forming apparatuses, such as printers, are provided with a transmitting function to transmit/receive data to/from external devices. When receiving a print job from the external device, such an image forming apparatus processes the print job and forms an image. That is, this kind of image forming apparatus has a function as a communication apparatus.

There is a known image forming apparatus (it may be hereafter called a device) that requires authentication when using the image forming apparatus itself or when using a function thereof. This kind of image forming apparatus allows using the device to an authenticated user only. There is known application software that provides such authentication. Hereafter, the above-mentioned authentication is called device authentication.

There is an image forming apparatus that allows using specific functions, such as a data transmitting function and a printing function, to an authenticated user only, and application software that provides such authentication is also known. Hereafter, such authentication is called function authentication.

Conventionally, an image forming apparatus that has the device authentication could set about whether the device authentication is performed. When being set to perform the device authentication, the image forming apparatus performs the user authentication at the time of log-in, and only a user who passed the user authentication can use the image forming apparatus. On the other hand, regarding the function authentication, the image forming apparatus can set permission or no-permission about transmission methods, such as electric mail transmission, facsimile transmission, and file transmission, for a user.

When the user passed the user authentication, the image forming apparatus disclosed in Japanese Laid-Open Patent Publication (Kokai) No. 2006-41598 (JP 2006-41598A) can input a new transmission job with reference to a transmission history (a history of a transmission job sent to the image forming apparatus) stored in the image forming apparatus.

However, the image forming apparatus disclosed in the above-mentioned publication opens the history information about the transmission job that has been executed by the authenticated user to other users, which may cause a security problem. For example, when a user who is not permitted to use the data transmitting function using an electric mail refers to the history information about the transmission job using an electronic mail, the user concerned may send data using an electronic mail. Or even when data cannot be sent using an electronic mail, transmission setting may be available with reference to the transmission history information. In such a case, an error occurs when instructing execution of transmission, which causes a problem of impairing usability.

Some image forming apparatuses having the device authentication are provided with a function to delete the transmission history information concerning a job (for example, a print job) executed during authentication when a user logs out.

However, when the transmission history information is deleted when the user logs out, the user cannot resend a transmission job even if the user logs in again and tries to send the transmission job based on the transmission history information about the jobs that have been executed.

SUMMARY OF THE INVENTION

The present invention relates to a communication apparatus, a control method therefor, and a storage medium storing a control program therefor, which are capable of referring to transmission history information in response to settings of use proprieties for transmission methods.

Accordingly, a first aspect of the present invention provides a communication apparatus having a transmitting function for transmitting data to another apparatus using one of transmission methods comprising a recording unit configured to record a history of a transmission job executed by the communication apparatus as transmission history information that includes a transmitting destination at least, a setting unit configured to set a use propriety of each of the transmission methods, and a determination unit configured to determine whether reference to the transmission history information is permitted in response to the use propriety of each of the transmission methods set by the setting unit and the transmitting destination included in the transmission history information, when a user instructs to refer to the transmission history information.

Accordingly, a second aspect of the present invention provides a control method for controlling a communication apparatus having a transmitting function for transmitting data to another apparatus using one of transmission methods, the control method comprising a recording step of recording a history of a transmission job executed by the communication apparatus as transmission history information that includes a transmitting destination at least, a setting step of setting a use propriety of each of the transmission methods, and a determination step of determining whether reference to the transmission history information is permitted in response to the use propriety of each of the transmission methods set in the setting step and the transmitting destination included in the transmission history information, when a user instructs to refer to the transmission history information.

Accordingly, a third aspect of the present invention provides a non-transitory computer-readable storage medium storing a control program causing a computer to execute a control method for a communication apparatus having a transmitting function for transmitting data to another apparatus using one of transmission methods, the control method comprising a recording step of recording a history of a transmission job executed by the communication apparatus as transmission history information that includes a transmitting destination at least, a setting step of setting a use propriety of each of the transmission methods, and a determination step of determining whether reference to the transmission history information is permitted in response to the use propriety of each of the transmission methods set in the setting step and the transmitting destination included in the transmission history information, when a user instructs to refer to the transmission history information.

According to the present invention, the transmission history information can be referred in response to the settings of the use proprieties of the transmission methods.

Further features of the present invention will become apparent from the following description of exemplary embodiments with reference to the attached drawings.

DESCRIPTION OF THE EMBODIMENTS

Hereafter, an example of a communication apparatus according to an embodiment of the present invention will be described with reference to the attached drawings. Although an image forming apparatus is described as an example of the communication apparatus, the present invention can be applied to apparatuses other than the image forming apparatus similarly.

Figure 1:
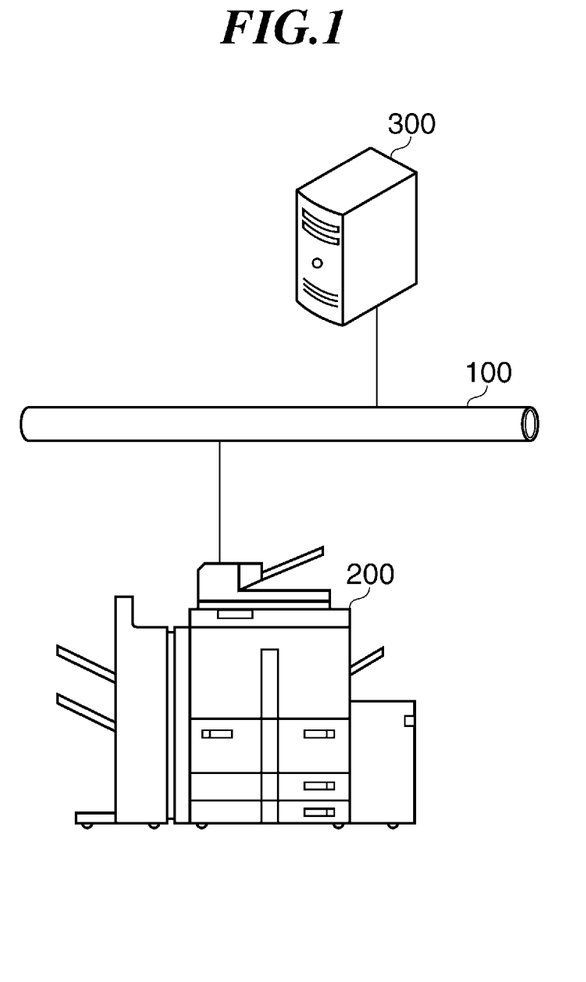
FIG. 1 is a view schematically showing utilizing environment about an example of an image forming apparatus as a communication apparatus according to an embodiment of the present invention.

FIG. 1 is a view schematically showing utilizing environment about an example of an image forming apparatus as a communication apparatus according to the embodiment of the present invention.

As shown in FIG. 1, the image forming apparatus illustrated is a multifunction printer (MFP) 200, for example. The MFP 200 is connected to a LDAP (Lightweight Directory Access Protocol) server 300 via a local area network (LAN) 100. The MFP 200 communicates with the LDAP server 300 (another apparatus) using protocol specified beforehand, and performs user authentication at the time of transmission mentioned later. That is, the MFP 200 has a transmitting/receiving function for transmitting and receiving data. Here, the MFP 200 is provided with a data transmitting function and a file transmitting function at least. Since this protocol is well known, a detailed description is omitted.

Figure 2:
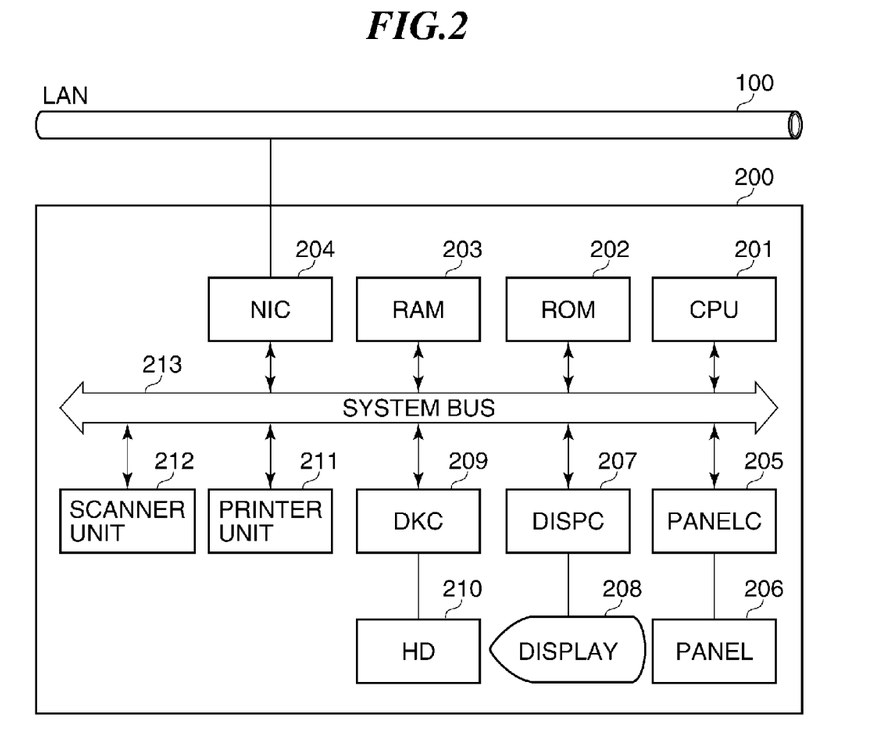
FIG. 2 is a block diagram schematically showing a hardware configuration of a MFP shown in FIG. 1.

FIG. 2 is a block diagram schematically showing a hardware configuration of the MFP 200 shown in FIG. 1.

As shown in FIG. 2, the MFP 200 is provided with a CPU 201, a ROM 202, a RAM 203, a network interface card (NIC) 204, an external input controller (PANELC) 205, and an operation unit 206 that is provided with various buttons or a touch panel. Moreover, the MFP 200 is provided with a display controller (DISPC) 207, a display 208, a disk controller (DKC) 209, and a hard disk (HD) 210. The MFP 200 is provided with a printer unit 211 and a scanner unit 212.

The CPU 201 generally controls devices connected to a system bus 213, and executes firmware stored in the ROM 202 or the HD 210 that is a large-scale storage device. It should be noted that the firmware comprises at least two or more modules, and is updated by each module.

The CPU 201 executes a process mentioned later based on the firmware that is a control program. It should be noted that the HD 210 may be used as temporary storage for image data. The RAM 203 is used as a main memory of the CPU 201, and a work area.

The PANELC 205 receives and controls instructions inputted via the operation unit 206. The DISPC 207 controls the display 208 and displays a screen on the display 208.

The NIC 204 bidirectionally exchanges data with other MFPs and file servers (not shown) or the LDAP server 300 (FIG. 1) via the LAN 100. The printer unit 211 forms an image on a recording paper according to an electrophotography process, for example. The scanner unit 212 reads an image formed on an original.

It should be noted that the scanner unit 212 is equipped with an automatic document feeder (not shown) as an option, and thereby, the scanner unit 212 can read originals automatically and continuously.

The MFP 200 illustrated requires transmission authentication as function authentication, for example. When performing the transmission authentication, the MFP 200 communicates with the LDAP server 300 via the LAN100, and performs user authentication. Then, as mentioned above, the user authenticated by the transmission authentication can use the transmitting function of the MFP 200.

Figure 3:
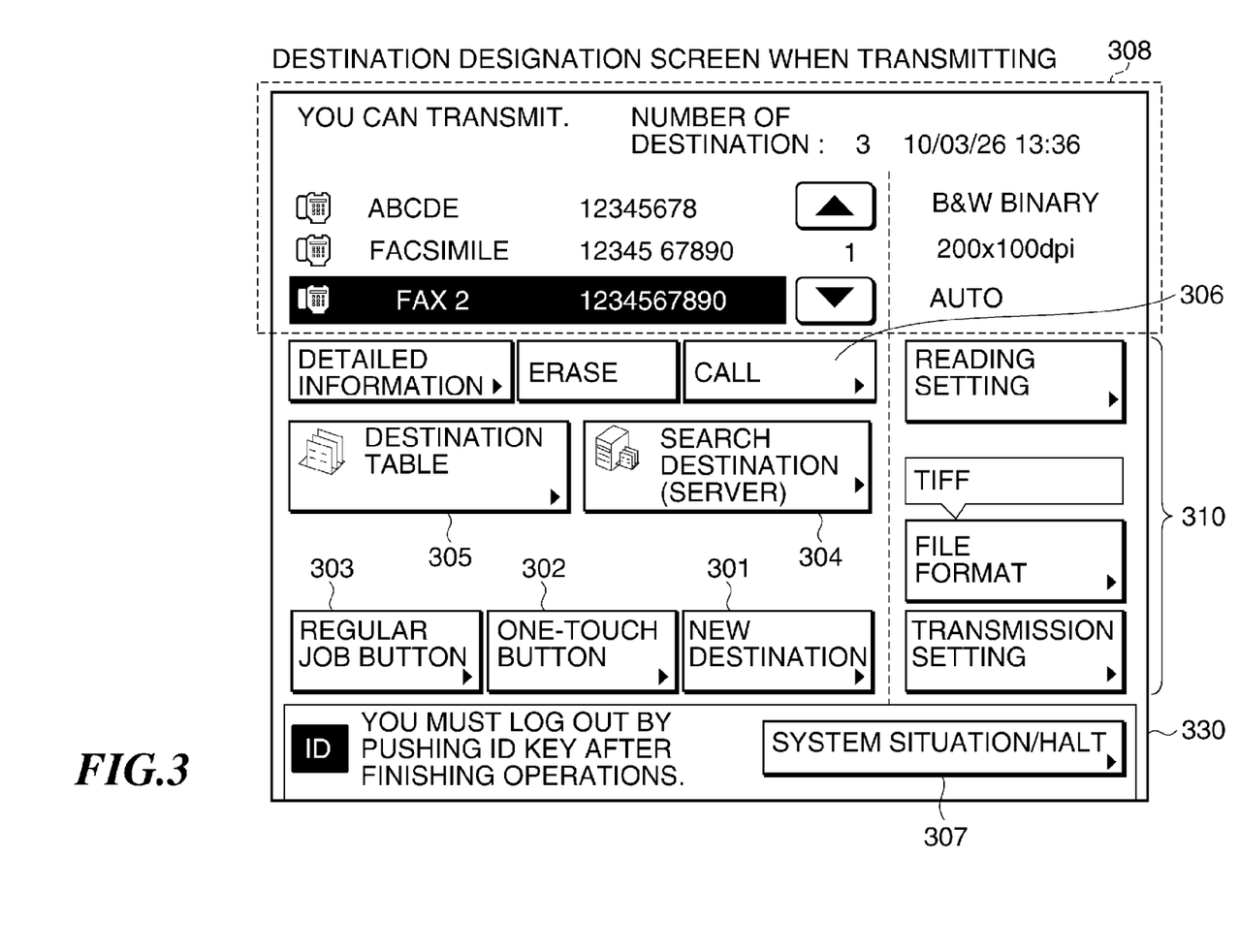
FIG. 3 is a view showing an example of a destination designation screen display that is displayed on the MFP shown in FIG. 2 at the time of a transmission instruction.

FIG. 3 is a view showing an example of a destination designation screen display that is displayed on the MFP 200 shown in FIG. 2 at the time of a transmission instruction. The display 208 has a touch panel. When the user pushes a button displayed on the display 208, a new screen is displayed in place of the screen concerned, or a popup menu is displayed on the display 208.

FIG. 3 shows a condition where a user was permitted to use the MFP 200 by the login authentication. When the user inputs a transmission instruction after the user concerned is permitted by the login authentication, the MFP 200 (i.e., the CPU 201) operates a communication function of the MFP 200. Then, the DISPC 207 displays a destination designation screen on the display 208 under control of the CPU 201. A new destination button 301 is displayed on this destination designation screen. It should be noted that the MFP 200 has the data transmitting function and the file transmitting function using an electronic mail at least.

The new destination button 301 is used for inputting a new destination. That is, when a user pushes the new destination button 301 at the time of transmission, the DISPC 207 displays a menu for entering a FAX number or an electronic mail (E-mail) address, an address for file transmission, a user name, a password, etc. under the control of the CPU 201.

Further, an one-touch button 302, a regular job button 303, a destination search button 304, a destination table 305, a call button 306, a system situation/halt button 307, setup buttons 310, and a destination display area 308 are displayed on the destination designation screen.

The one-touch button 302 is used for displaying destination buttons registered as one-touch buttons. The regular job button 303 is used for displaying a list of regular job buttons that call settings of transmitting destinations or a read setting collectively. The destination search button is used for searching the LDAP server 300 (FIG. 1) for a destination, and is used for setting the retrieved destination as a transmitting destination.

The destination table 305 is used for displaying the destination table registered. The call button 306 is used for displaying the destinations that were designated as the transmitting destination in the past. An operation of the call button 306 displays a last button, a second last button, and a third last button as described below. A push of each button calls the destination and the transmission setting of the past transmission. That is, when the last button is pushed, the CPU 201 calls the destination and the transmission setting of the last transmission, and displays them on the display 208 through the DISPC 207. Similarly, when the second last button or the third last button is pushed, the CPU 201 calls the destination and the transmission setting of the second last transmission or the third last transmission, and displays them on the display 208 through the DISPC 207.

The system situation/halt button 307 is a menu button for displaying the job under process in the MFP 200 (FIG. 1). When the system situation/halt button 307 is pushed, the CPU 201 displays situations of a copy, transmission/reception, facsimile, a print, and a device on the display 208 through the DISPC 207. Then, a condition and history of each job, and status of the apparatus are displayed on the display 208. As described below, a transfer error job that was failed to transmit at the time of transfer can be transmitted again using the system situation/halt button 307.

The destination display area 308 is a displaying area in which information that is designated to transmit is displayed. In the left part of the destination display area 308 in FIG. 3, transmitting status, the number of destinations, and three destinations are displayed. On the other hand, in the right part of the destination display area 308 in the illustrated example, current time and reading parameters (B&W/color: B&W BINARY, resolution: 200×100 dpi, and reading density: AUTO) are displayed in the order from the top.

In the illustrated example, a reading setting, a file format, and a transmission setting are set by the setup buttons 310. In the reading setting, resolution, B&W/color, reading size, density, etc. are set. The file format is selected from TIFF, JPEG, PDF, PDF+OCR, etc. In the transmission setting, timer transmission, a settled stamp, a transmission document name, a subject name, a body, a reply address, a sender name, etc. are set.

Figure 4:
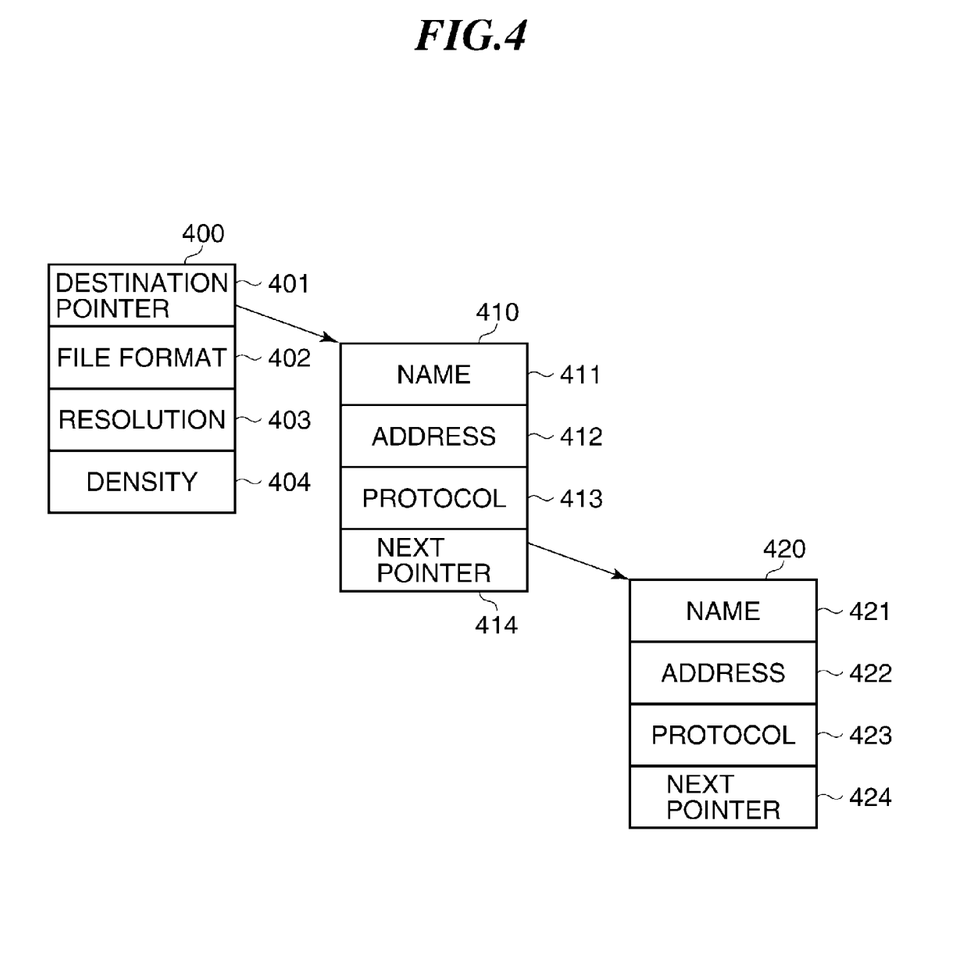
FIG. 4 is a view showing data structure of destination data at the time of storing transmission history information to a RAM in the MFP shown in FIG. 2.

FIG. 4 is a view showing data structure of destination data at the time of storing transmission history information to the RAM 203 in the MFP 200 shown in FIG. 2.

As shown in FIG. 4, the RAM 203 (FIG. 2) stores transmission history records 400. Then, each of the transmission history records 400 holds transmission job information. Each of the transmission history records 400 has information that shows a transmitting destination pointer 401, a file format 402, resolution 403, and density 404 as the transmission job information.

The transmitting destination pointer 401 expresses a connection to transmission destination information, and the file format 402 expresses information that shows the file format used by the transmission job. The resolution 403 expresses the resolution used when storing an image. The density 404 expresses the image density used when storing an image.

In the illustrated example, the destination pointer 401 points at the destination information record 410 that shows the information about the transmitting destination. The destination information record 410 consists of a name 411, an address 412, a protocol 413, and a next pointer 414. The name 411 expresses a name of the destination. The address 412 expresses a telephone number in a facsimile transmission, or an E-mail address in an E-mail transmission, for example. Then, the address 412 designates a folder name of the transmitting destination in a file transmission.

The protocol 413 expresses protocols used for the transmissions, such as the facsimile transmission, the E-mail transmission, and the file transmission. The next pointer 414 points at the next destination information record, when there are two or more destinations. When there is the second destination, the address of the next destination information record 420 is contained in the following pointer 414. Then, the next destination information record 420 consists of the information elements similar to the above-mentioned destination information record 410.

It should be noted that the next destination information record 420 consists of a name 421, an address 422, a protocol 423, and a next pointer 424.

Figure 5:
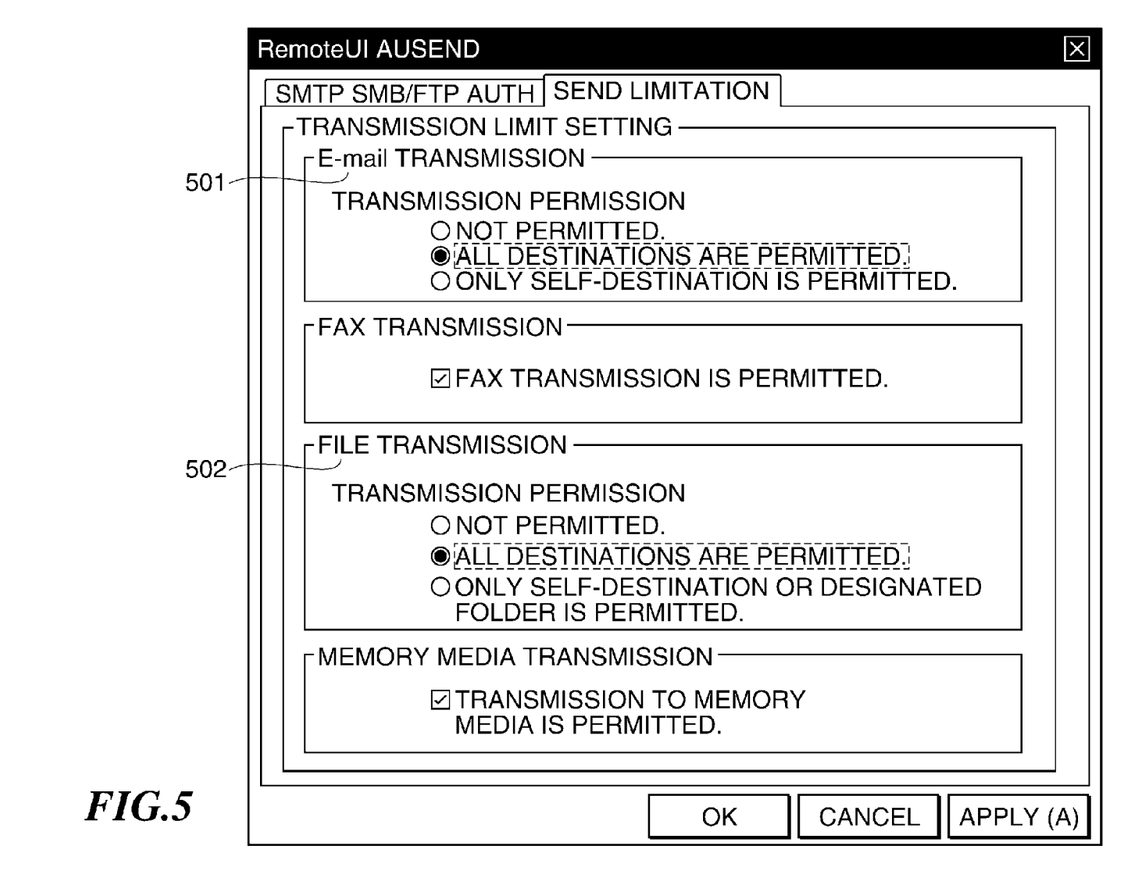
FIG. 5 is a view showing examples of transmission limit parameters set in the RAM in the MFP shown in FIG. 2.

FIG. 5 is a view showing examples of transmission limit parameters set in the RAM 203 in the MFP 200 shown in FIG. 2.

In FIG. 5, the transmission limit parameters include an E-mail transmission setting, a facsimile transmission setting, a file transmission setting, and a memory media transmission setting, for example. In the illustrated example, the MFP 200 holds a set value about a destination that is permitted for the E-mail transmission regarding the E-mail transmission setting 501.

Regarding the E-mail transmission setting 501, when "NOT PERMITTED" is selected, the MFP 200 (i.e., the CPU 201) operates under a condition that does not permit the E-mail transmissions to any of destinations. On the other hand, regarding the E-mail transmission setting 501, when "ALL DESTINATIONS ARE PERMITTED" is selected, the MFP 200 permits the E-mail transmissions to all the destinations. Regarding the E-mail transmission setting 501, when "ONLY SELF-DESTINATION IS PERMITTED" is selected, the MFP 200 permits only the E-mail transmission of which the transmitting destination is a person (a user) who logged in. It should be noted that the E-mail address of the person who logged in is notified to the MFP 200 from the LDAP server 300 at the time of a login authentication, and is stored in the MFP 200 (for example, the RAM 203).

The above-mentioned E-mail transmission setting 501 can be set by the user via the display 208, i.e., the touch panel. The user can perform the E-mail transmission setting 501 also by remote UI access through the LAN 100.

Regarding the file transmission setting 502, the MFP 200 holds a set value about a destination to which the file transmission is permitted. Regarding the file transmission setting 502, when "NOT PERMITTED" is selected, the MFP 200 (i.e. the CPU 201) does not permit any file transmissions.

Regarding the file transmission setting 502, when "ALL DESTINATIONS ARE PERMITTED" is selected, the MFP 200 permits the file transmissions to all the transmitting destinations without limitation. Regarding the file transmission setting 502, when "ONLY SELF-DESTINATION OR DESIGNATED FOLDER IS PERMITTED" is selected, the MFP 200 permits the file transmissions when the transmitting destination is a folder that the person who logged in holds or when the folder is beforehand designated by the LDAP server 300.

The settings in the E-mail transmission setting 501 and the file transmission setting 502 are set values that fundamentally determine whether the transmissions are permitted. However, the illustrated example uses the set values of the E-mail transmission setting 501 and the file transmission setting 502 in association with reference to a transmission history (an operation of the call button 306). Then, the detail of this will be described later with reference to a flowchart shown in FIG. 6. It should be noted that with respect to a facsimile transmission setting and a memory media transmission setting, it is set up, respectively whether it is "facsimile transmission being permitted" and "permitting transmission to memory media."

Figure 6:
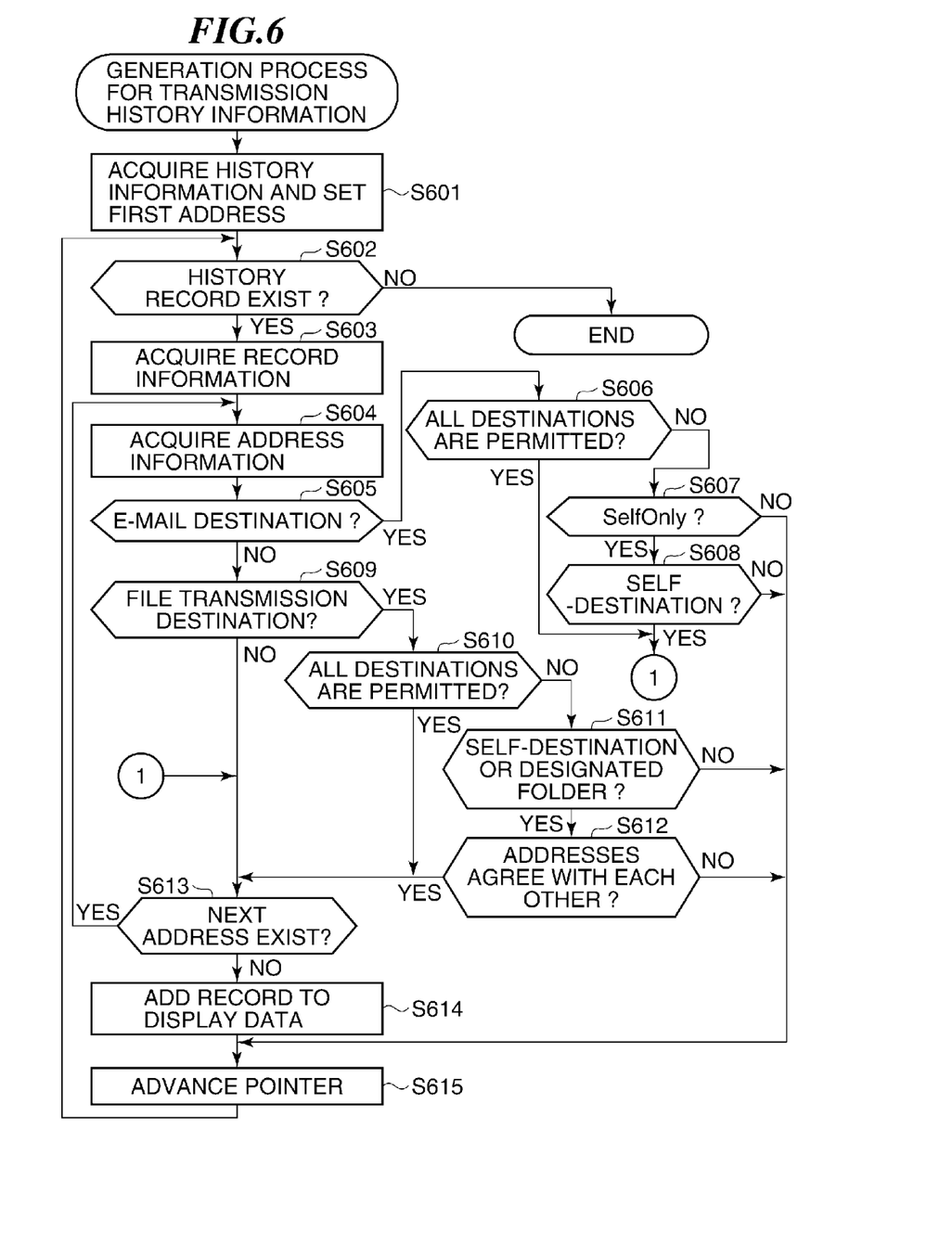
FIG. 6 is a flowchart showing a generation process for the transmission history information at the time of referring to the transmission history in the MFP shown in FIG. 2.

FIG. 6 is a flowchart showing a generation process for transmission history information at the time of referring to the transmission history in the MFP 200 shown in FIG. 2.

Here, assuming that the user has received the login authentication of the MFP 200. When the user inputs a transmission instruction, the CPU 201 activates a transmitting function (it is also called a communication function), and the DISPC 207 displays a destination designation screen on the display 208 under control of the CPU 201.

In the destination designation screen, when the call button 306 is pushed, the CPU 201 acquires a first address in the transmission history record in the transmission history information stored in the RAM 203, and sets it to an internal pointer (step S601).

It should be noted that the transmission history record has the data format shown in FIG. 4. Next, the CPU 201 checks the transmission history record set to the internal pointer, and determines whether a transmission history record exists (step S602).

When no transmission history records exist (NO in the step S602), the CPU 201 finishes the generation process for the transmission history information. On the other hand, when the transmission history record exists (YES in the step S602), the CPU 201 acquires record information (the transmission history record 400 shown in FIG. 4, step S603).

Next, the CPU 201 acquires the destination information record 410 based on the transmitting destination pointer 401 (step S604). Then, the CPU 201 checks about whether the transmitting destination is an E-Mail destination based on the address 412 and the transmission protocol 413 of the destination information record 410 (step S605).

When the transmitting destination is an E-Mail destination (YES in the step S605), the CPU 201 checks about whether the E-mail transmission setting 501 is set to "ALL DESTINATIONS ARE PERMITTED" (step S606).

When the E-mail transmission setting 501 is set to "ALL DESTINATIONS ARE PERMITTED" (YES in the step S606), since the address 412 of the destination information record 410 is permitted to transmit, the CPU 201 determines to allow the reference to the transmission history. Then, the CPU 201 proceeds with the process to step S613, and checks about whether other transmitting destinations (other addresses) exist.

When the E-mail transmission setting 501 is not set to "ALL DESTINATIONS ARE PERMITTED" (NO in the step S606), the CPU 201 checks about whether the E-mail transmission setting 501 is set to "ONLY SELF-DESTINATION IS PERMITTED" (SelfOnly) (step S607).

When the E-mail transmission setting 501 is not set to the "ONLY SELF-DESTINATION IS PERMITTED" (NO in the step S607), since the E-mail transmission is "NOT PERMITTED" (refusal), the CPU 201 does not add the destination history record 410 concerned to the transmission history information. Then, the CPU 201 proceeds with the process to step S615, and determines about the next transmission history record.

When the E-mail transmission setting 501 is set to the "ONLY SELF-DESTINATION IS PERMITTED" (YES in the step S607), the CPU 201 checks about whether the information that shows the address 412 of the destination information record 410 agrees with the address (informed address) notified from the LDAP server 300 (FIG. 1) as a mail address of the login user (step S608).

When the address 412 agrees with the notified address (YES in the step S608), since the address 412 of the destination information record 410 is permitted to transmit, the CPU 201 determines to allow the reference to the transmission history. Then, the CPU 201 proceeds with the process to step S613, and checks about whether other transmitting destinations exist.

On the other hand, when the address 412 does not agree with the notified address (NO in the step S608), since the address 412 of the destination information record 410 must not transmit, the CPU 201 does not add the destination history record 410 concerned to the transmission history information. Then, the CPU 201 proceeds with the process to step S615, and determines about the next transmission history record.

Thus, the CPU 201 compares the transmitting destination with the E-mail (electronic mail) transmission setting, and determines whether the reference (i.e., displaying) of the transmission history information is permitted according to the comparison result.

When the transmitting destination is not an E-Mail destination (NO in the step S605), the CPU 201 checks about whether the transmitting destination is a file transmitting destination based on the address 412 and the transmission protocol 413 of the destination information record 410 (step S609). When the transmitting destination is a file transmitting destination (YES in the step S609), the CPU 201 checks about whether the file transmission setting 502 is set to "ALL DESTINATIONS ARE PERMITTED" (step S610).

When the file transmission setting 502 is set to "ALL DESTINATIONS ARE PERMITTED" (YES in the step S610), since the address 412 of the destination information record 410 is permitted to transmit, the CPU 201 determines to allow the reference to the transmission history. Then, the CPU 201 proceeds with the process to step S613, and checks about whether other transmitting destinations exist.

When the file transmission setting 502 is not set to the "ALL DESTINATIONS ARE PERMITTED" (NO in the step S610), the CPU 201 checks about whether the file transmission setting 502 is set to "ONLY SELF-DESTINATION (SelfOnly) OR DESIGNATED FOLDER IS PERMITTED" (step S611). Here, the designated folder is a registration folder registered beforehand. For example, the HD 210 stores a name of the registration folder as a registration-folder name.

When the file transmission setting 502 is not set to the "ONLY SELF-DESTINATION OR DESIGNATED FOLDER IS PERMITTED" (NO in the step S611), since the file transmission is "NOT PERMITTED" (refusal), the CPU 201 does not add the destination history record 410 to the transmission history information. Then, the CPU 201 proceeds with the process to step S615, and advances the pointer of the transmission history record one step in order to process the next transmission history information.

When the file transmission setting 502 is set to the "ONLY SELF-DESTINATION OR DESIGNATED FOLDER IS PERMITTED" (YES in the step S611), the CPU 201 checks about whether the address 412 of the destination information record 410 corresponds to the folder (the notice folder) notified from the LDAP server as the transmitting destination folder of the login user or the folder (the registration folder) registered as the transmitting destination folder (step S612).

When the address 412 of the destination information record 410 corresponds to the notice folder or the registration folder (YES in the step S612), since the address 412 of the destination information record 410 is permitted to transmit, the CPU 201 determines to allow the reference to the transmission history. Then, the CPU 201 proceeds with the process to step S613, and checks whether other transmitting destinations exist.

On the other hand, when the address 412 of the destination information record 410 does not correspond to the notice folder and the registration folder (NO in the step S612), since the address 412 of the destination information record 410 must not transmit, the CPU 201 do not add the destination information record concerned to the transmission history information. Then, the CPU 201 proceeds with the process to step S615, and advances the pointer of the transmission history record one step in order to process the next transmission history information.

Thus, the CPU 201 compares the transmitting destination with the file transmission setting, and determines whether the reference (i.e., displaying) of the transmission history information is permitted according to the comparison result.

When the transmitting destination is not the file transmitting destination (NO in the step S609), the CPU 201 checks whether the pointer 414 following the destination information record 410 that is shown by the transmitting destination pointer 401 exists (step S613). Then, when the following pointer 414 exists (YES in the step S613), the CPU 201 returns the process to the step S604 and acquires the address 422 from the next destination information record 420.

When the next pointer 414 does not exist (i.e., it is Null; NO in the step 613), since the current record is the last data as the destination, the CPU 201 adds the transmission history record 400 to the displaying data so as to allow to display for a user (step S614).

Then, the CPU 201 advances the pointer of the transmission history record one step in order to process the next transmission history information. Then, the CPU 201 returns the process to the step S602, and continues the process.

Thus, regarding the transmission history information, the CPU 201 determines whether the destination can be notified to a user. Then, when the transmission history is referred to (when the call button 306 is pushed), the CPU 201 displays only the destinations that can be notified to a user on the display 208.

Figure 7A:
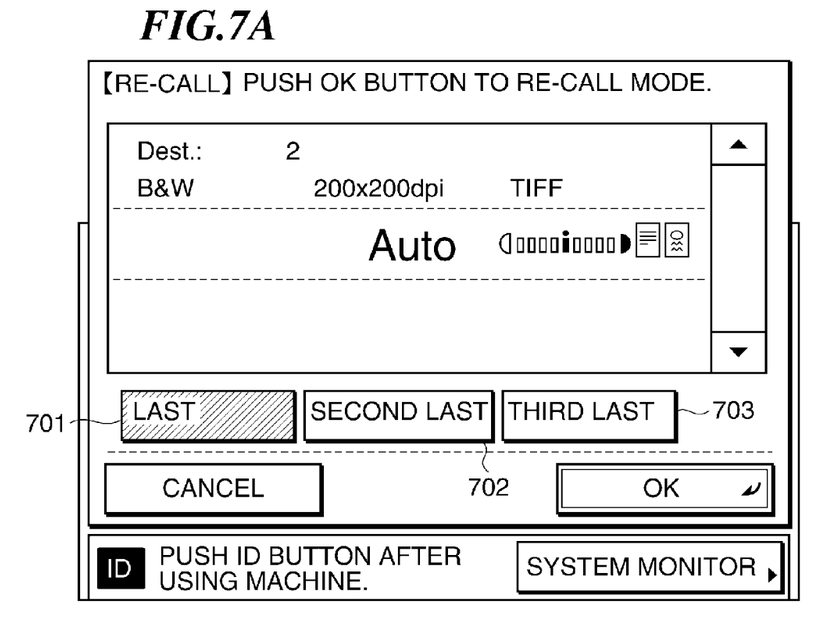
FIG. 7A is a view showing a screen displayed when all pieces of the transmission history information can be displayed at the time of referring to the transmission history in the MFP shown in FIG. 2.
Figure 7B:
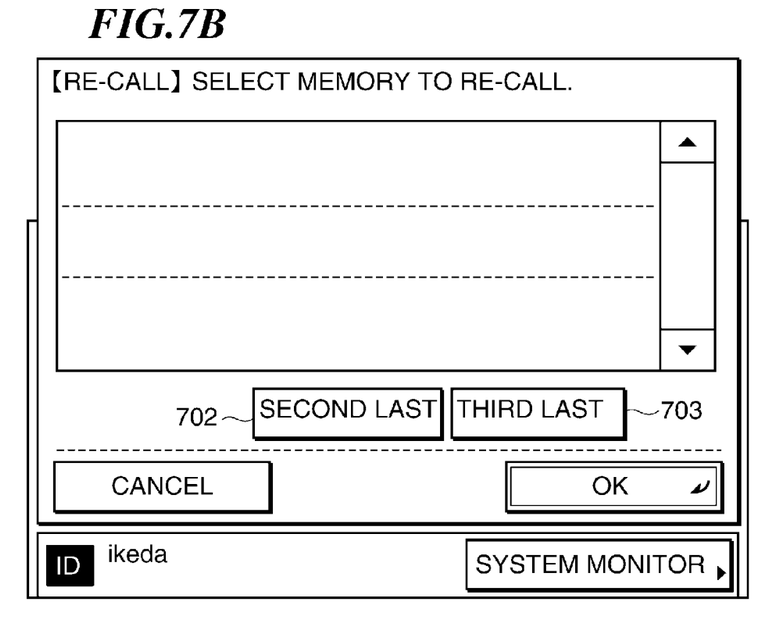
FIG. 7B is a view showing a screen displayed when one piece of the transmission history information is not permitted to display at the time of referring to the transmission history in the MFP shown in FIG. 2.

FIG. 7A is a view showing a screen displayed when all pieces of the transmission history information can be displayed at the time of referring to the transmission history in the MFP 200 shown in FIG. 2. FIG. 7B is a view showing a screen displayed when one piece of the transmission history information is not permitted to display at the time of referring to the transmission history in the MFP 200 shown in FIG. 2.

In FIG. 7A, since all pieces of the transmission history information can be displayed, the CPU 201 controls the DISPC 207 to display all of a last button 701, a second last button 702, and a third last button 703 on the display 208. When the last button 701 is pushed, the CPU 201 calls the destination and the transmission setting of the last transmission, and displays them as the transmission history information on the display 208 through the DISPC 207. Similarly, when the second last button 702 or the third last button 703 is pushed, the CPU 201 calls the destination and the transmission setting of the second last transmission or the third last transmission, and displays them as the transmission history information on the display 208 through the DISPC 207.

On the other hand, in the example shown in FIG. 7B, the destination corresponding to the last button is not permitted to display. Accordingly, the CPU 201 does not display an icon of the last button concerned on the display 208. Then, in the illustrated example, since the CPU 201 determined that the destinations corresponding to the second last button 702 and the third last button 703 can be displayed, the CPU 201 displays icons of the buttons concerned on the display 208.

Thus, the CPU 201 displays the button icon corresponding to the transmission history information that can be displayed on the display 208, and retains the security about the reference to the transmission history information.

As mentioned above, the MFP 200 according to the embodiment of the present invention determines whether the reference to the transmission history information is permitted in response to the transmission setting and the transmitting destination, when the display of the transmission history information is instructed and when the function-authentication function operates after performing the login authentication by the login-authentication function regarding the display of the transmission history information. Therefore, when the transmission history information is displayed, the transmission history information can be displayed according to the security level.

As is evident from the above-mentioned description, the CPU 201 shown in FIG. 2 functions as a determination unit, and the CPU 201, the RAM 203, the DKC 209, and the HD 210 function as a recording unit. Then, the CPU 201, the RAM 203, the operation unit 206, the display 208, etc. function as a setting unit that sets a use propriety of each of the transmission methods.

Although the embodiments of the invention have been described, the present invention is not limited to the above-mentioned embodiments, the present invention includes various modifications as long as the concept of the invention is not deviated.

For example, an information processing apparatus like an image forming apparatus may execute a control method that is defined by the functions of the above-mentioned embodiment. Moreover, a computer with which the information processing apparatus like the image forming apparatus is provided may execute a control program that has the functions of the above-mentioned embodiment. In this case, each of the control method and the control program has a recording step and a determination step at least.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-103193, filed on Apr. 28, 2010, which is hereby incorporated by reference herein in its entirety.

What is claimed is:

1. A communication apparatus having a transmitting function for transmitting data to another apparatus using at least a first transmission method and a second transmission method, comprising:

a recording unit configured to record a history of a transmission job executed by the communication apparatus as transmission history information that includes a transmitting destination at least;

a setting unit configured to set whether or not to permit a use of each of the first transmission method and the second transmission method; and a determination unit configured to determine whether reference to the transmission history information is permitted in response to a setting by said setting unit and the transmitting destination included in the transmission history information, when a user instructs to refer to the transmission history information.

2. The communication apparatus according to claim 1, wherein the first transmission method is a method of transmitting the data using an electronic mail.

3. The communication apparatus according to claim 1, wherein the second transmission method is a method of file-transmitting the data to a folder.

4. A control method for controlling a communication apparatus having a transmitting function for transmitting data to another apparatus using at least a first transmission method and a second transmission method, the control method comprising:

a recording step of recording a history of a transmission job executed by the communication apparatus as transmission history information that includes a transmitting destination at least;

a setting step of setting whether or not to permit a use of each of the first transmission method and the second transmission method; and a determination step of determining whether reference to the transmission history information is permitted in response to a setting in said setting step and the transmitting destination included in the transmission history information, when a user instructs to refer to the transmission history information.

5. A non-transitory computer-readable storage medium storing a control program causing a computer to execute a control method for a communication apparatus having a transmitting function for transmitting data to another apparatus using at least a first transmission method and a second transmission method, the control method comprising:

a recording step of recording a history of a transmission job executed by the communication apparatus as transmission history information that includes a transmitting destination at least;

a setting step of setting whether or not to permit a use of each of the first transmission method and the second transmission method; and a determination step of determining whether reference to the transmission history information is permitted in response to a setting in said setting step and the transmitting destination included in the transmission history information, when a user instructs to refer to the transmission history information.

6. A communication apparatus which is capable of transmitting data using at least a first transmission method and a second transmission method, comprising:

a recoding unit configured to record a history of a plurality of transmission jobs that are executed in the past by the communication apparatus;

a setting unit configured to set whether or not to permit a use of each of the first transmission method and the second transmission method; and a determination unit configured to determine to permit reference to the history of the transmission jobs corresponding to one of the first transmission method and the second transmission method, the use of which is set to be permitted by said setting unit, and determine not to permit reference to the history of transmission jobs corresponding to one of the first transmission method and the second transmission method, the use of which is set to be not permitted by said setting unit.

7. The communication apparatus according to claim 6, wherein the first transmission method is a method of transmitting the data using an electronic mail.

8. The communication apparatus according to claim 6, wherein the second transmission method is a method of file-transmitting the data to a folder.

9. The communication apparatus according to claim 6, further comprising a displaying unit configured to display an operation key that calls settings of the transmission jobs that are executed in the past by the communication apparatus, wherein said displaying unit displays the operation key corresponding to the transmission job, of which reference to the history is determined to be permitted by said determination unit, and does not display the operation key corresponding to the transmission job, of which reference to the history is determined to be not permitted by said determination unit.

10. A communication apparatus which is capable of transmitting data, comprising:

a recording unit configured to record a history of a plurality of transmission jobs that are executed in the past by the communication apparatus;

a setting unit configured to set not to permit the data-transmission of which destination is not an authenticated user; and a determination unit configured to determine, in a case where said setting unit sets not to permit the data-transmission of which destination is not the authenticated user, to permit reference to the history of the transmission jobs, of which transmitting destination is the authenticated user, and not to permit the reference to the history of the transmission jobs, of which transmitting destination is not the authenticated user, out of the plurality of transmission jobs.

11. The communication apparatus according to claim 10, further comprising a displaying unit configured to display an operation key that calls settings of the transmission jobs that are executed in the past by the communication apparatus, wherein said displaying unit displays the operation key corresponding to the transmission job, of which reference to the history is determined to be permitted by said determination unit, and does not display the operation key corresponding to the transmission job, the history of which is determined to be not permitted by said determination unit.

12. A control method for controlling a communication apparatus which is capable of transmitting data using at least a first transmission method and a second transmission method, comprising:

a recoding step of recording a history of a plurality of transmission jobs that are executed in the past by the communication apparatus;

a setting step of setting whether or not to permit a use of each of the first transmission method and the second transmission method; and a determination step of determining to permit reference to the history of the transmission jobs corresponding to one of the first transmission method and the second transmission method, the use of which is set to be permitted at said setting step, and determine not to permit reference to the history of transmission jobs corresponding to one of the first transmission method and the second transmission method, the use of which is set to be not permitted at said setting step.

13. A control method for controlling a communication apparatus which is capable of transmitting data, comprising:
   a recording step of recording a history of a plurality of transmission jobs that are executed in the past by the communication apparatus;
   a setting step of setting not to permit the data-transmission of which destination is not an authenticated user; and
   a determination step of determining, in a case where said setting unit sets not to permit the data-transmission of which destination is not the authenticated user, to permit reference to the history of the transmission jobs, of which transmitting destination is the authenticated user, and not to permit the reference to the history of the transmission jobs, of which transmitting destination is not the authenticated user, out of the plurality of transmission jobs.

14. A non-transitory storage computer-readable storage medium storing a control program causing a computer to execute a control method for controlling a communication apparatus which is capable of transmitting data using at least a first transmission method and a second transmission method, the control method comprising:
   a recoding step of recording a history of a plurality of transmission jobs that are executed in the past by the communication apparatus;
   a setting step of setting whether or not to permit a use of each of the first transmission method and the second transmission method; and
   a determination step of determining to permit reference to the history of the transmission jobs corresponding to one of the first transmission method and the second transmission method, the use of which is set to be permitted at said setting step, and determine not to permit reference to the history of transmission jobs corresponding to one of the first transmission method and the second transmission method, the use of which is set to be not permitted at said setting step.

15. A non-transitory storage computer-readable storage medium storing a control program causing a computer to execute a control method for controlling a communication apparatus which is capable of transmitting data, the control method comprising:
   a recording step of recording a history of a plurality of transmission jobs that are executed in the past by the communication apparatus;
   a setting step of setting not to permit the data-transmission of which destination is not an authenticated user; and
   a determination step of determining, in a case where said setting unit sets not to permit the data-transmission of which destination is not the authenticated user, to permit reference to the history of the transmission jobs, of which transmitting destination is the authenticated user, and not to permit the reference to the history of the transmission jobs, of which transmitting destination is not the authenticated user, out of the plurality of transmission jobs.

* * * * *